(12) United States Patent
Liu et al.

(10) Patent No.: US 6,442,020 B1
(45) Date of Patent: Aug. 27, 2002

(54) SHIELDING DEVICE FOR COMPUTER ENCLOSURE

(75) Inventors: Alvin Liu, Pa-Li; Yu Tai Liu, Hsin-Chuang; Kuang-Yu Chen, Tu-Chen, all of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/632,076

(22) Filed: Aug. 2, 2000

(30) Foreign Application Priority Data

Mar. 9, 2000 (TW) .......................................... 089203754

(51) Int. Cl.[7] ................................................ G06F 1/16
(52) U.S. Cl. ...................... 361/683; 361/725; 361/727; 361/802; 312/223.1; 211/41.17
(58) Field of Search ................................. 361/681, 683, 361/684–685, 725–727, 753, 759, 788, 801, 802, 816, 818, 798; 312/223.1, 223.2, 319.1, 319.2; 211/41.17; 206/701, 702; 174/35 R; 70/57, 58; 360/137 D, 900, 97.01, 98.01; 248/581, 60, 609, 611, 346.03, 500, 346.04

(56) References Cited

U.S. PATENT DOCUMENTS

| | | | | |
|---|---|---|---|---|
| 5,191,544 A | * | 3/1993 | Benck et al. | 364/708 |
| 5,216,582 A | * | 6/1993 | Russell et al. | 361/395 |
| 5,549,375 A | * | 8/1996 | Pagliaccio | 312/319.1 |
| 6,061,244 A | * | 5/2000 | O'Sullivan et al. | 361/727 |
| 6,278,606 B1 | * | 8/2001 | Schmitt et al. | 361/683 |
| 6,288,902 B1 | * | 9/2001 | Kim et al. | 361/725 |

FOREIGN PATENT DOCUMENTS

EP          0520173 A2 * 12/1992 ............. G06F/1/18

* cited by examiner

Primary Examiner—Darren Schuberg
Assistant Examiner—Michael Datskovsky
(74) Attorney, Agent, or Firm—Wei Te Chung

(57) ABSTRACT

A shielding device (10) is removably received in a drive bracket (82) of a computer enclosure (80). The shielding device includes a shell (12) and a pair of rails (16). The shell electrically contacts and covers a bay in a front panel (86) of the computer enclosure thereby providing shielding from electromagnetic interference. The rails are removably attached to the shell to be received in the drive bracket for supporting the shell therein.

10 Claims, 6 Drawing Sheets

SHIELDING DEVICE FOR COMPUTER ENCLOSURE

BACKGROUND

1. Field of the Invention

The present invention relates to a shielding device for a computer enclosure, and particularly to a shielding device which is readily received in or detached from a drive bracket of a computer enclosure.

2. The Related Art

A computer enclosure receives a plurality of data storage devices, such as a CD-ROM drive or a floppy drive. Correspondingly, the front panel of the computer enclosure defines a plurality of bays to expose the data storage devices. When a data storage device is to be mounted in the computer enclosure, a detachable plate which is integrally formed with the front panel to provide a shielding function is first removed. This provides access to the corresponding bay for mounting the data storage device therein. However, detaching the plate from the front panel is complicated and time-consuming. Furthermore once the plate is taken off, it can not be reinstalled. Thus when a data storage device is removed from the computer enclosure, a gap is left in the enclosure shielding and electromagnetic interference may occur.

To counter the above problems, a separate plate has been designed for fixing to a front panel by screws, such as that disclosed in Taiwan Patent Application No. 84210437. However assembling/disassembling the separate plate to/from the front panel is cumbersome and time-consuming.

Furthermore, a data storage device is usually attached to the drive bracket by rails. Extra rails are required to be stored in another place for future use, which is cumbersome and can result in loss of the rails.

In addition, a data storage device requires grounding to reduce electromagnetic interference, and a simpler grounding arrangement is desired.

SUMMARY OF THE INVENTION

Accordingly, an object of the present invention is to provide a shielding device which is readily attached to a computer enclosure to protect devices in the computer enclosure from outside electromagnetic interference.

Another object of the present invention is to provide a shielding device which is easily detached from a computer enclosure for facilitating repeated use.

A further object of the present invention is to provide a shielding device which is attached to a computer enclosure using rails to reserve the rails for future use with a data storage device.

A further object of the present invention is to provide a shielding device which electrically contacts adjacent data storage devices for reducing electromagnetic interference.

To fulfil the above mentioned objects, a shielding device of the present invention is removably received in a drive bracket of a computer enclosure. The shielding device includes a shell and a pair of rails. The shell electrically contacts and covers a bay in a front panel of the computer enclosure thereby shielding the interior of the enclosure from electromagnetic interference. The rails are removably attached to the shell to be received in the drive bracket for supporting the shell therein.

BRIEF DESCRIPTION OF THE DRAWINGS

Other objects, advantages and novel features of the present invention will be drawn from the following detailed description of the embodiment of the present invention with attached drawings, in which.

DESCRIPTION OF THE PREFERRED EMBODIMENT

Figure 1:
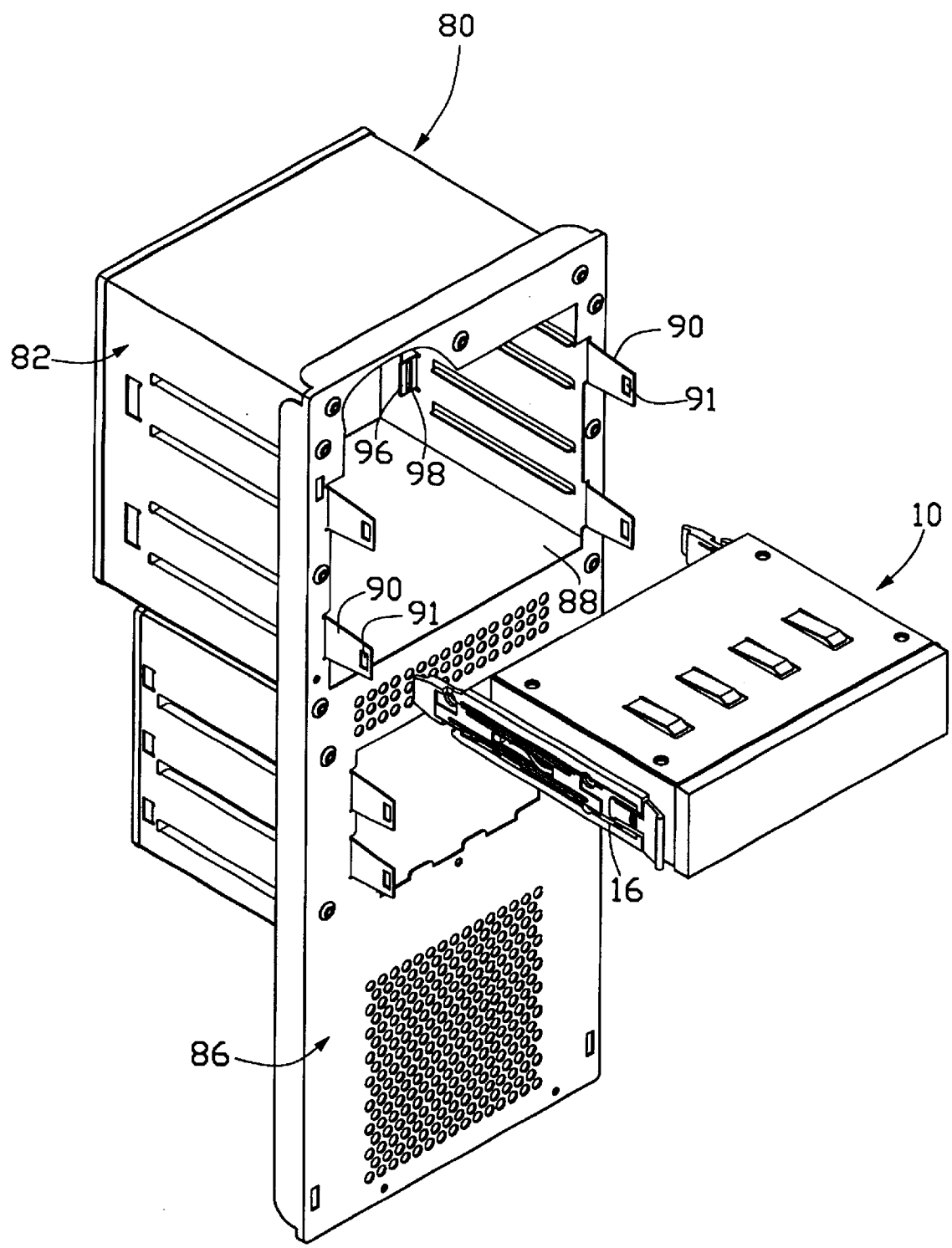
FIG. 1 is a perspective view of a partly shown computer enclosure to which a shielding device in accordance with the present invention is about to be attached.

Referring to FIG. 1, a computer enclosure 80 comprises a front panel 86, a drive bracket 82 attached to the front panel 86 and a shielding device 10 received in the drive bracket 82. The drive bracket 82 defines two bays (not labelled) therein, each bay for mounting one data storage device 100 (see FIG. 7) or, in the absence of a data storage device 100, a shielding device 10. The front panel 86 defines an opening 88 corresponding to the drive bracket 82.

Two pairs of tabs 90 each defining an aperture 91 therein extend outward from the front panel 86 at opposite sides of the opening 88. Two pairs of ledges 96 each defining a slot 98 perpendicularly and inwardly extend from the drive bracket 82 opposite the tabs 90 of the front panel 86.

Figure 2:
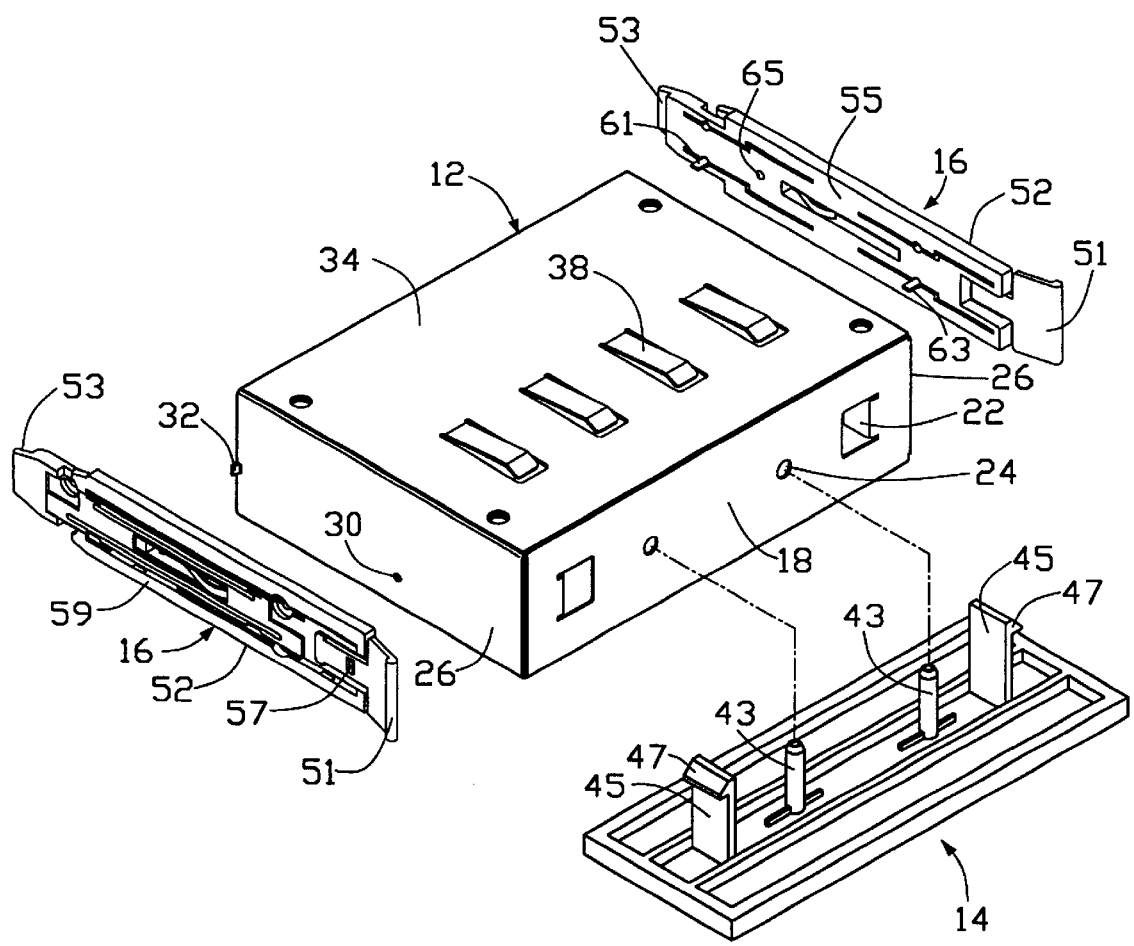
FIG. 2 is an exploded view of a shielding device of FIG. 1.
Figure 3:
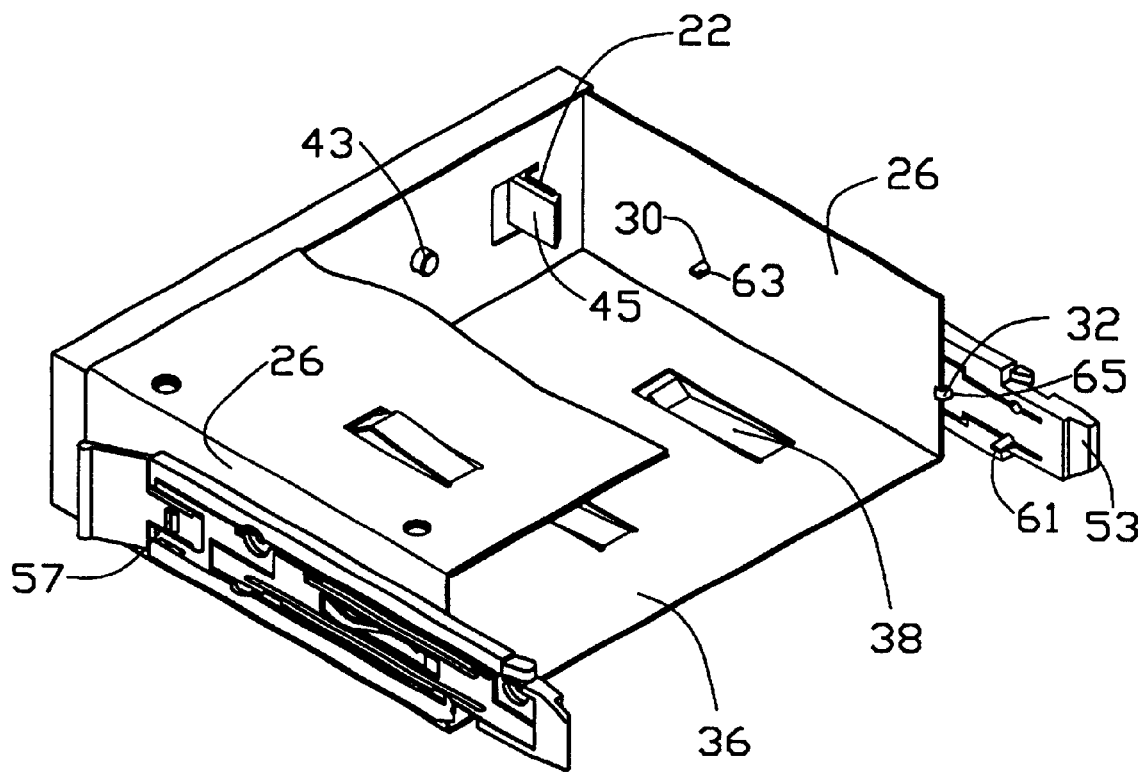
FIG. 3 is an assembled view of FIG. 2.
Figures 4, 5:
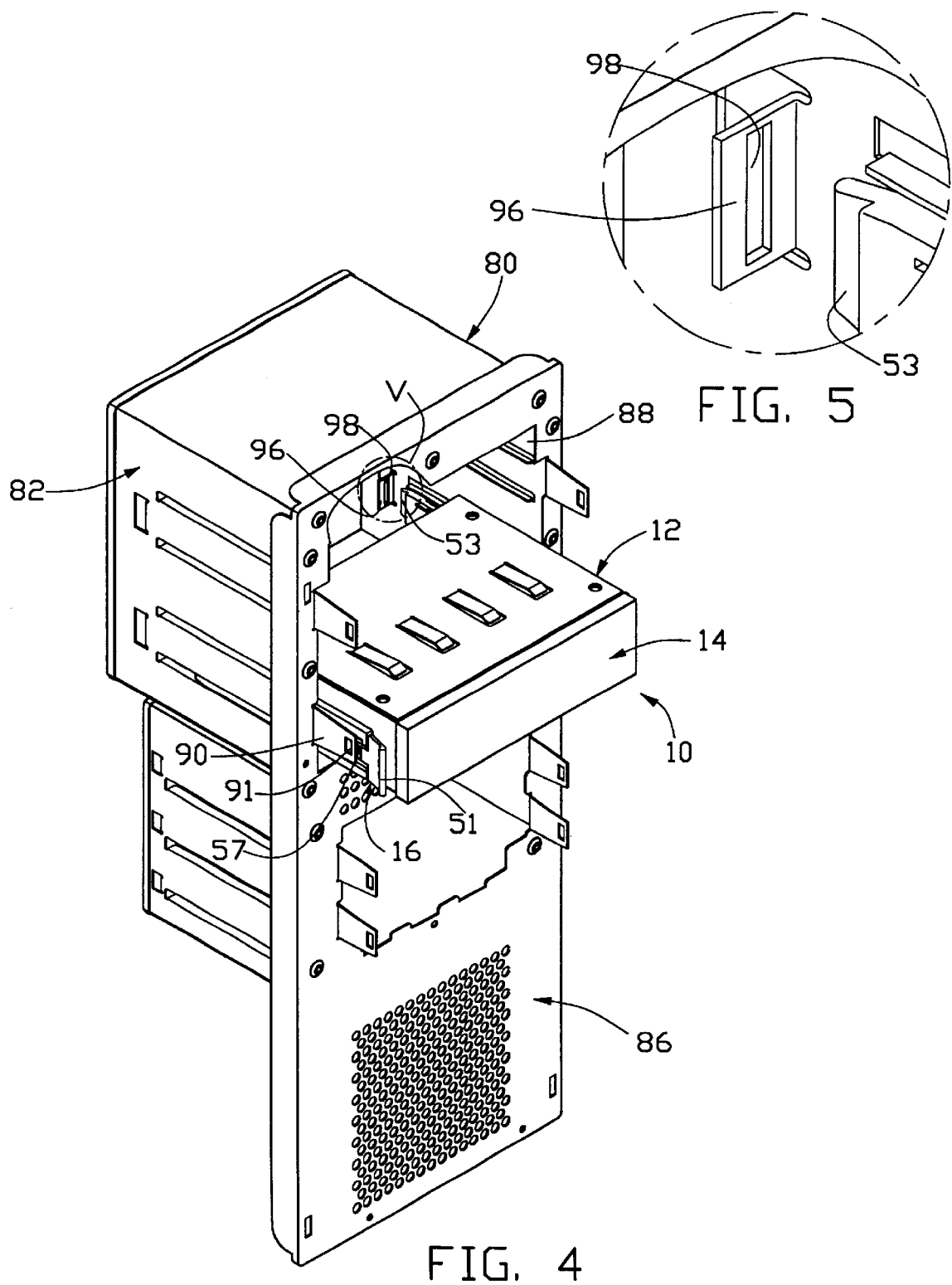
FIG. 4 is a partially assembled view of FIG. 1 showing a shielding device being received in a drive bracket.
FIG. 5 is an enlarged view of encircled portion V of FIG. 4.
Figure 6:
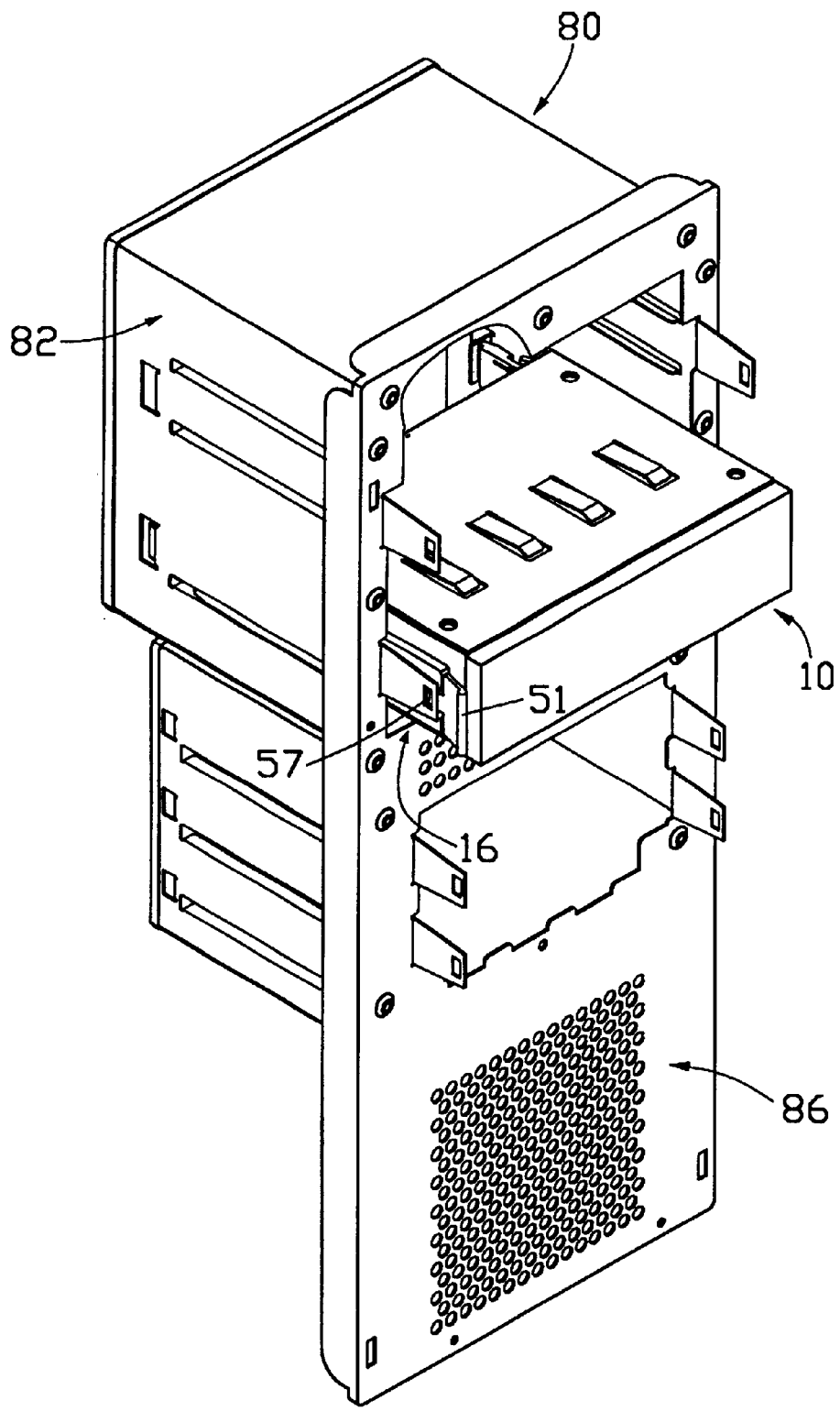
FIG. 6 is similar to FIG. 4 but showing that the shielding device has been received in the drive bracket.

Referring to the FIGS. 2 and 3, the shielding device 10 includes a shell 12, a bezel 14 and a pair of rails 16. The shell 12 is fabricated from sheet metal and is generally in a shape of a data storage device. A plurality of springs 38 are formed on a top surface 34 and a bottom surface 36 of the shell 12 to electrically contact the drive bracket 82 or a data storage device mounted in the drive bracket 82 for forming grounding paths. Opposite side surfaces 26 of the shell 12 each defines a through hole 30 and a bent tab 32 for fixing the rails 16 in a manner to be described. A pair of fixing plates 22 extends inward from a front surface 18 of the shell 12. A pair of locating holes 24 is defined in the front surface 18 of the shell 12 adjacent the fixing plates 22. A pair of locating poles 43 extends from the bezel 14 for engagingly extending into the locating holes 24 of the shell 12. A pair of latches 45 is formed on the bezel 14 with outward tapering portions 47 to snap over the fixing plates 22 of the shell 12 thereby fixing the bezel 14 to the shell 12.

The rail 16 comprises a body potion 52, a resilient portion 51 extending from one end of the body potion 52, and a root portion 53 extending from the other end of the body potion 52. The rail 16 has a first surface 55 and a second surface 59 opposite the first surface 55. The body portion 52 defines a through hole 65 for receiving the tab 32 of the shell 12. Protrusions 61 and 63 extend from the first surface 55 of the body portion 52. The protrusion 63 is for extending into hole 30 of the shell 12 thereby attaching the rail 16 to the shell 12. The protrusion 61 is designed for engaging with a future data storage device. The resilient portion 51 forms a protrusion 57 at the second surface 59 for engaging with the aperture 91 of the tab 90 on the front panel 86 (Shown the FIG. 1). The root portion 53 is sized to be extendable into the slot 98 of the ledge 96 on the drive bracket 82 (Shown in FIG. 1).

Referring to the FIGS. 1 and 4–6, the shielding device 10 extends through the opening 88 of the front panel 86 and then is readily attached to or detached from the drive bracket 82 of the computer enclosure 80 using the rails 16. Due to the shell 12 covering a bay in the front panel 86, the computer enclosure 80 is shielded from electromagnetic interference. The rails 16 are conveniently reserved for future use with a data storage device. A data storage device, adjacently mounted on or under the shielding device 10, is electrically in contact with the springs 38 of the shielding device 10 thereby reducing electromagnetic interference.

Figure 7:
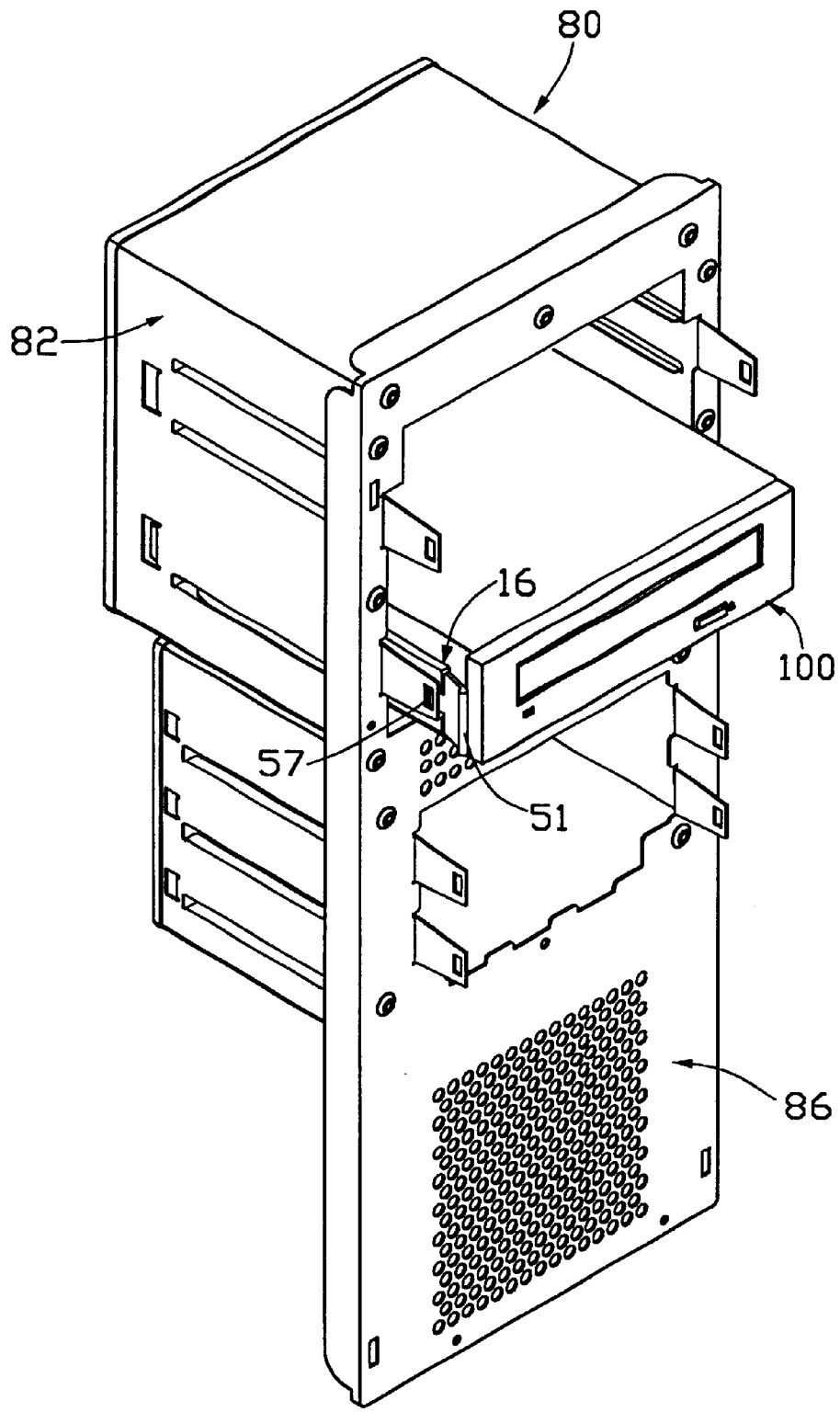
FIG. 7 is similar to FIG. 6 but showing that a data storage device instead of a shielding device is received in the drive bracket.

Referring to the FIG. 7, when a data storage device 100 is to be mounted to the drive bracket 82 in a bay occupied by a shielding device 10, the shielding device 10 is detached therefrom. The rails 16 are detached from the shielding device 10 and attached to the data storage device 100. Then with the rails 16, the data storage device 100 is inserted into drive bracket 82 thereby being securely received in the drive bracket 82.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A shielding device adapted to be received in a bay of a drive bracket of a computer enclosure, comprising:

a conductive shell adapted to electrically contact and cover the bay in a front panel of the computer enclosure thereby providing shielding from electromagnetic interference; and a pair of rails removably attached to the shell, adapted to be received in the drive bracket of the computer enclosure for supporting the shielding device; wherein the shell has a plurality of springs on a top thereof.

2. The shielding device as described in claim 1, wherein the shell is in a shape of a data storage device.

3. The shielding device as described in claim 1, wherein the shell has a plurality of springs on a bottom thereof.

4. The shielding device as described in claim 1, wherein the shell has a bezel attached to a front surface thereof.

5. The shielding device as described in claim 4, wherein the shell has at least a locating hole and wherein the bezel has at least a locating pole for extending into the locating hole of the shell.

6. The shielding device as described in claim 4, wherein the shell has at least a fixing plate and wherein the bezel has at least a latch for snapping over the fixing plate of the shell.

7. The shielding device as described in claim 1, wherein the shell has a through hole on each side surface and wherein the rail has a protrusion for extending into the through hole of the shell.

8. The shielding device as described in claim 1, wherein the shell has a bent tab on each side surface and wherein the rail has a through hole for receiving the bent tab of the shell.

9. An assembly comprising:

a front panel defining an opening;

a drive bracket attached to said front panel corresponding to said opening, said drive bracket defining at least one bay;

a shielding device including top, bottom and two side walls commonly defining a space for receiving a data storage device therein; and a pair of rails attached to said two side walls of the shielding device; wherein the shielding device is retainably received within said bay of the drive bracket by engagement between the rails and the drive bracket regardless of whether the data storage device is received within the shielding device or not; wherein the front panel includes at least one tab, in alignment with said bay, with therein an aperture engaged with a first end of one of the pair of rails.

10. The assembly as described in claim 9, Therein the drive bracket includes, in said bay, at least one ledge with therein a slot engaged with a second end of said one of said pair of rails, the second end being opposite the first end.

\* \* \* \* \*